United States Patent
Payne

(10) Patent No.: US 6,865,222 B1
(45) Date of Patent: Mar. 8, 2005

(54) METHOD AND APPARATUS FOR TESTING A SERIAL TRANSMITTER CIRCUIT

(75) Inventor: Robert Floyd Payne, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 722 days.

(21) Appl. No.: 09/643,499

(22) Filed: Aug. 22, 2000

Related U.S. Application Data

(60) Provisional application No. 60/156,013, filed on Sep. 23, 1999.

(51) Int. Cl.[7] ................................................ H04B 3/46
(52) U.S. Cl. ..................... 375/224; 375/340; 375/372; 714/30; 714/39
(58) Field of Search ........................ 375/340, 362, 375/364, 368, 224, 342, 372; 370/241, 242, 243, 246, 252, 510, 514; 714/1, 25, 30, 37, 39

(56) References Cited

U.S. PATENT DOCUMENTS

| | | | | |
|---|---|---|---|---|
| 5,903,619 A | * | 5/1999 | Chaisemartin | .............. 375/366 |
| 5,974,104 A | * | 10/1999 | Dhara | ......................... 375/368 |
| 6,094,443 A | * | 7/2000 | Dwork | ....................... 370/510 |
| 6,201,829 B1 | * | 3/2001 | Schneider | ................... 375/221 |
| 6,584,592 B2 | * | 6/2003 | Omura et al. | ............... 714/733 |

* cited by examiner

*Primary Examiner*—Amanda T. Le
(74) *Attorney, Agent, or Firm*—J. Dennis Moore; W. James Brady, III; Frederick J. Telecky, Jr.

(57) ABSTRACT

An integrated circuit (12) contains a serializing transmitter, including a phase locked loop (31) that supplies seven clocks (41) with different phases to a serializer circuit (32). The serializer circuit accepts 7-bit words at a parallel input (42), and outputs these words serially in an end-to-end manner on a twisted pair (17), as a clock signal. The serializer circuit also accepts 7-bit words on a further parallel input (43), and transmits them serially in an end-to-end manner on a twisted pair (18), as serialized data. The integrated circuit also includes a built-in self-test circuit (33), which can supply test information to the two parallel inputs of the serializer circuit, and which can monitor the two twisted pairs while the serializer circuit operates at high data rates typical of normal operation, in order to detect any errors introduced by the serializer circuit. The self-test circuit produces a single digital output (48) to indicate whether an error has been detected.

19 Claims, 3 Drawing Sheets

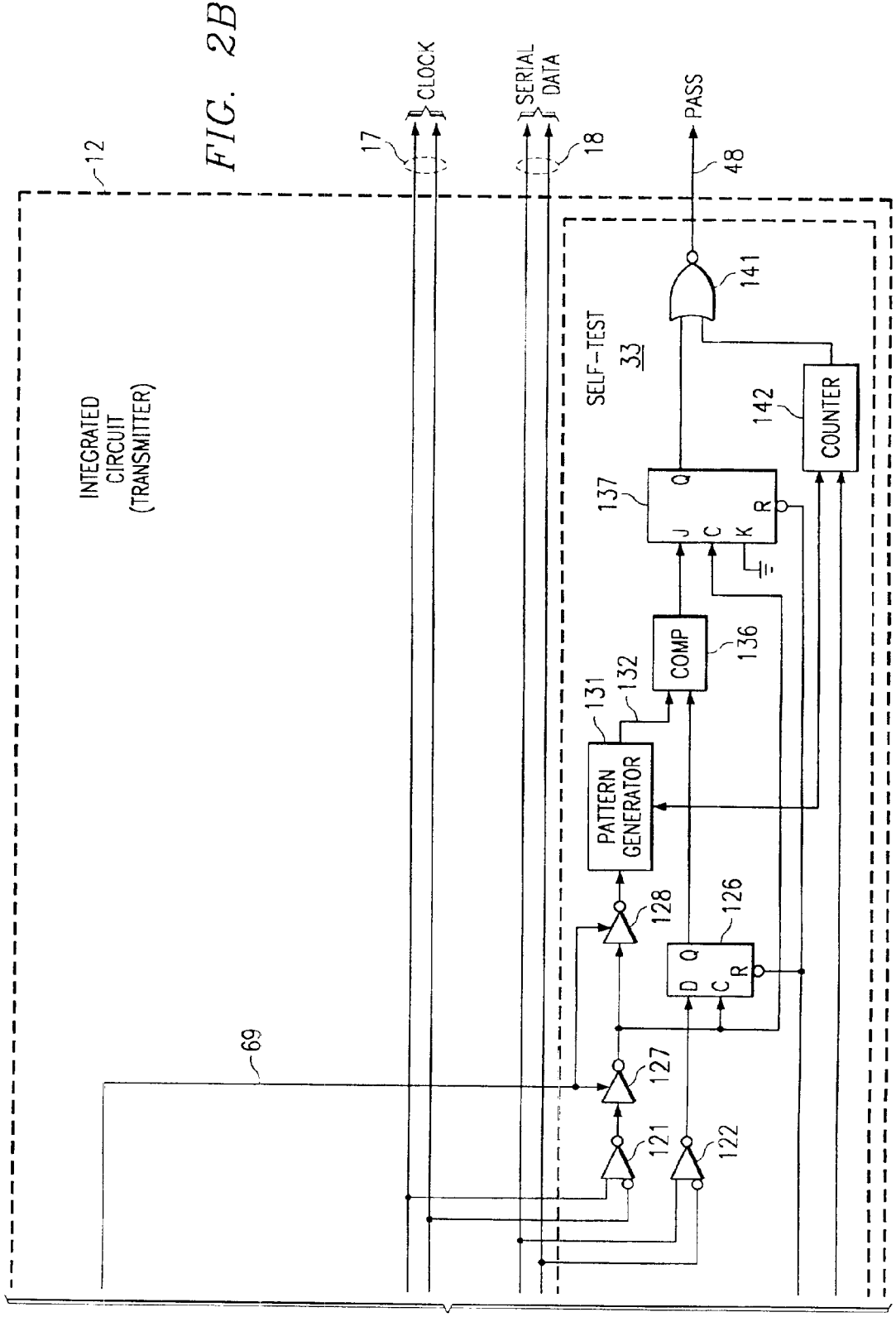

METHOD AND APPARATUS FOR TESTING A SERIAL TRANSMITTER CIRCUIT

This application claims priority under 35 USC §119(e)(1) of provisional application number 60/156,013 filed Sep. 23, 1999.

TECHNICAL FIELD OF THE INVENTION

This invention relates in general to testing of a serial transmitter circuit and, more particularly, to a method and apparatus for testing a serial transmitter circuit at high data rates which are typical of normal operation.

BACKGROUND OF THE INVENTION

There are a variety of applications which use a serial transmitter circuit of the type that receives a series of multi-bit words at a parallel input, and then transmits those words serially in an end-to-end manner at a serial output. During the manufacture of an integrated circuit which includes such a transmitter circuit, the transmitter circuit must be tested for proper operation. Where the transmitter circuit will be used in real-world applications that involve high data rates, it is appropriate to test the transmitter circuit at comparable data rates. However, commercial test platforms are typically not capable of operating at comparably high data rates, with the exception of certain high performance test platforms that are prohibitively expensive.

In many applications, the serial communication between opposite ends of a serial communication link involves two-way communications. In other words, both a transmitter circuit and a receiver circuit are provided at each end of the communication link. For applications of this type, it is common to use one integrated circuit at each end of the communications link, where each such integrated circuit contains both a transmitter circuit and a receiver circuit. During testing of such an integrated circuit, the serial output of the transmitter circuit can be coupled to the serial input of the receiver circuit on the same chip, so that the transmitter circuit and receiver circuit can each be operated at the high data rates they will experience in normal operation, under the control of an external test platform which does not need to directly monitor the high-speed serial data stream, and which can thus operate at a substantially slower speed than the serial data stream.

There are other applications, however, where the serial data communications across a serial communications link effectively involve only one-way communications. One example of such an application is a portable computer of the type commonly known as a notebook computer. A notebook computer typically has a case and a lid which are pivotally coupled to each other, the case containing the microprocessor and most other circuitry, and the lid containing a liquid crystal display (LCD). When the microprocessor is executing a state-of-the-art program which includes a graphical user interface (GUI), display data must be transmitted from the microprocessor to the display at a very high rate, but there is no data which needs to be sent from the display back to the microprocessor. Thus, the communications between the microprocessor and the display are one-way communications.

Due to the fact that the lid is pivotally coupled to the case, it is desirable to minimize the number of wires which must be routed from the case to the lid through the hinge connection. Accordingly, it is customary to send this data serially from the microprocessor through the hinge to the display. Since the serial communications are one-way, the microprocessor needs a serial transmitter circuit, and the display needs a serial receiver circuit, but the microprocessor does not need a serial receiver circuit and the display does not need a serial transmitter circuit. Thus, for purposes of normal operational use, the integrated circuit which includes the serial transmitter circuit for the microprocessor does not need to also include a serial receiver circuit. Consequently, it is not possible to use the traditional test technique described above, in which the serial transmitter and receiver on a given integrated circuit are serially coupled to each other for purposes of test. There is thus an issue of how to effectively test such an integrated circuit, which has a serial transmitter, but no serial receiver.

One approach would be to use a high-speed test platform. However, as noted above, they are prohibitively expensive. An alternative approach would be to provide an entire deseralizing receiver circuit in the same integrated circuit chip, solely to permit testing of the serial transmitter circuit using the traditional technique, while using a test platform which is inexpensive and operates at slower rates. However, this can almost double the size of the overall circuitry in the integrated circuit, and thus the physical size of the integrated circuit. Due to the increased complexity and size, the integrated circuit costs more, and is more susceptible to manufacturing defects and mismatches that reduce the effective yield of chips from the manufacturing process.

SUMMARY OF THE INVENTION

From the foregoing, it may be appreciated that a need has arisen for a method and apparatus for facilitating testing of a serializing transmitter circuit at the high serial data rates typical of normal operation, but without requiring the use of a full deserializing receiver circuit or a high-speed test platform. According to the present invention, a method and apparatus are provided to address this need, and include: instructing a serializing transmitter circuit to output a serial bitstream that conforms to a defined bit sequence; sampling a plurality of selected bits in the bitstream to determine a state of each of the selected bits, each such selected bit being separated from other selected bits in the bitstream by at least one nonselected bit; and determining whether the state obtained for each selected bit by sampling conforms to an expected state thereof according to the defined bit sequence.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
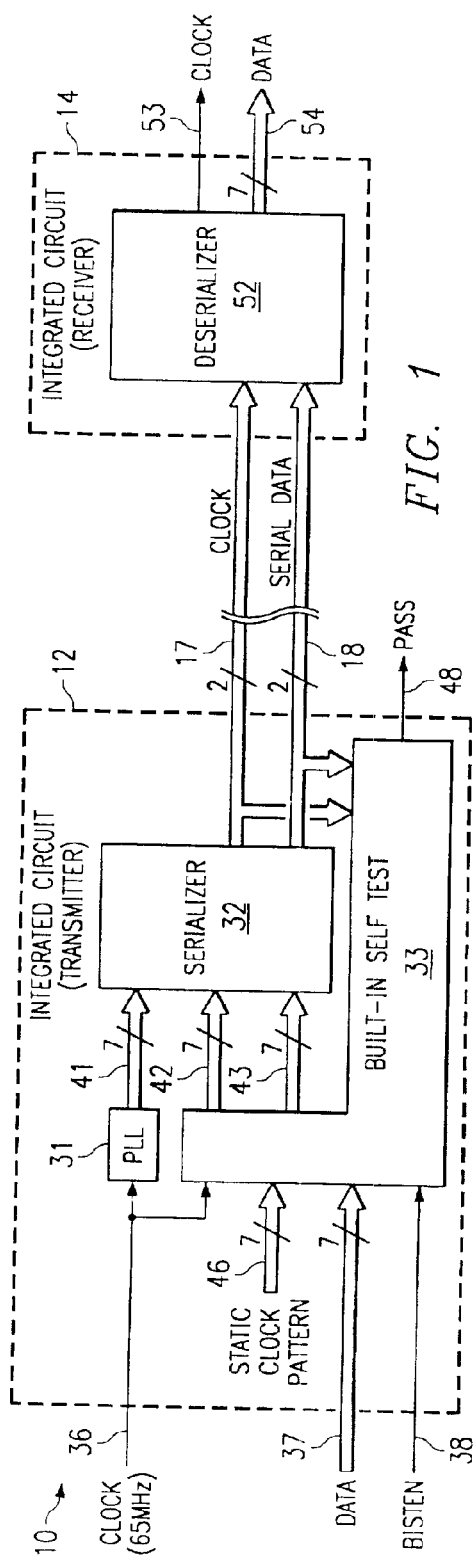
FIG. 1 is a block diagram of a serial communication system which embodies the present invention, the system including two integrated circuits that respectively contain a serializing transmitter circuit and a serializing receiver circuit, and that are coupled by two twisted wire pairs which each carry a respective differential signal.

FIG. 1 is a block diagram of a serial communication system 10 which embodies the present invention. The system 10 includes a first integrated circuit 12 which contains a transmitter, a second integrated circuit 14 which contains a receiver, a twisted pair 17 which carries a clock signal from the transmitter in integrated circuit 12 to the receiver in integrated circuit 14, and a further twisted pair 18 which carries serial data from the transmitter in integrated circuit 12 to the receiver in integrated circuit 14.

The embodiment disclosed in FIG. 1 is configured for use in a not-illustrated portable computer, namely a portable computer of the type commonly known as a notebook computer. A notebook computer has a lid pivotly coupled to a case, the case containing the main microprocessor, and the lid containing a liquid crystal display (LCD). When the microprocessor is executing a state-of-the-art program of the type having a graphical user interface (GUI), a substantial amount of display data must be transferred rapidly from the microprocessor in the case to the display in the lid. This involves one-way communication, because the display does not need to send information back to the microprocessor. Due to the hinge which is provided between the lid and case, it is desirable to minimize the number of wires which must be routed from the circuitry in the case to the display in the lid. Accordingly, it is common to transmit the data serially from the circuitry in the case through the hinge to the display in the lid. Communication system 10 (FIG. 1) is configured for such an application. In particular, the integrated circuit 12 with the transmitter would be provided in the case, the twisted pairs 17 and 18 would extend through the hinge arrangement, and the integrated circuit 14 with the receiver would be provided in the lid.

Referring now in more detail to FIG. 1, the integrated circuit 12 includes a phase locked loop (PLL) 31, a serializer circuit 32 of known configuration, and a built-in self test (BIST) circuit 33. The inputs to the integrated circuit 12 include a reference clock input 36 which, in the disclosed embodiment, receives a reference clock signal having a frequency of 65 MHz. The inputs to the integrated circuit 36 further include a parallel data input 37 which accepts 7-bit words, and a built-in self test circuit enable (BISTEN) signal input 38.

In response to the reference clock 36, the PLL 31 generates seven different clock signals 41, which each have the 65 MHz frequency of the reference clock 36, but which are offset in phase with respect to each other by a uniform phase offset. The seven clock signals 41 are supplied to the serializer circuit 32. The serializer circuit 32 also receives 7-bit clock information at 42, and 7-bit data information at 43. When the self-test circuit 33 is disabled by the BISTEN signal 38, the self-test circuit 33 supplies to the lines 42 a static clock pattern 46, which in the disclosed embodiment is the 7-bit binary word "1111000", and supplies to the data lines 43 the same data information which is received on the lines 37. The serializer circuit 32 takes the 7-bit words received as clock information at 42, and consecutively sends these 7-bit words serially over the twisted pair 17 at a bit rate which is seven times the rate at which the serializer circuit 32 accepts 7-bit words on the lines 42. Similarly, the seven-bit data words which are received on the lines 43 are sent serially on the twisted pair 18, at a bit rate which is seven times the rate at which 7-bit words are received on the lines 43. It will thus be noted that, to the extent 7-bit words are received on lines 43 at a rate of 65M words per second, the twisted pair 18 will be transmitting bits at seven times that rate, or in other words at 455M bits per second. It will also be noted that, when the binary word "1111000" is transmitted repeatedly in serial fashion on twisted pair 18, the result is effectively a clock signal at 65 MHz, and this clock signal is synchronized to the data transmitted on twisted pair 17.

The self-test circuit 33 is used only during manufacturing testing of the integrated circuit 12. After the integrated circuit 12 has successfully completed manufacturing testing, the self-test circuit 33 is kept disabled at all times, and in fact the ultimate user of the integrated circuit 12 will probably not be aware that the self-test circuit 33 is even present on the chip. During manufacturing testing, the BISTEN signal 38 is activated in order to enable the self-test circuit 33. When enabled, the self-test circuit 33 ignores the static clock pattern 46 and the data information received at 37, and generates its own test information to be supplied at 42 and 43 to the serializer circuit 32, as explained in more detail later. In addition, when the self-test circuit 33 is enabled, it monitors twisted pairs 17 and 18, in order to determine whether the information which the serializer circuit 32 is transmitting on the twisted pairs 17 and 18 is correct in view of the test information supplied on lines 42 and 43. The self-test circuit 33 produces an output 48 which is brought off the integrated circuit 12. The self-test circuit 33 activates the output 48 if the integrated circuit 12 passes the test carried out by the self-test circuit 33 while it is enabled.

The other integrated circuit 14 includes a deserializer circuit 52 of a known type, which receives the clock on twisted pair 17 and the serial data on twisted pair 18. The deserializer circuit 52 converts the serial data on twisted pair 18 into a series of 7-bit words, which are successively output in parallel on lines 54, and which correspond directly to the 7-bit words received at 43 by the serializer 32. The deserializer circuit 52 also outputs at 53 a clock signal, which is derived from the clock information on twisted pair 17, and which is synchronized to the data words output on lines 54.

Figure 2A:
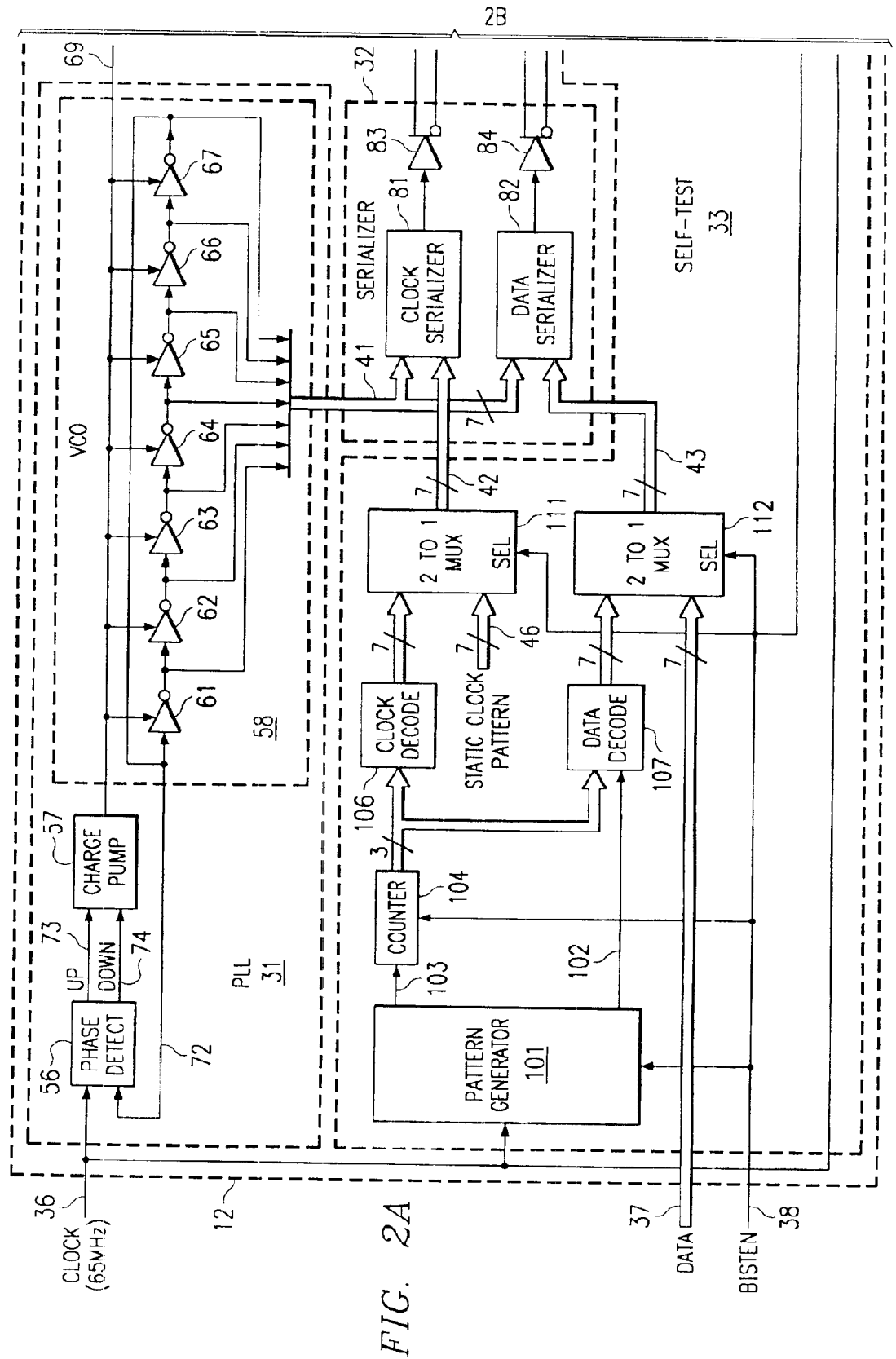
FIG. 2 is a schematic diagram of one of the integrated circuits in the system of FIG. 1, which is the integrated circuit that includes the serializing transmitter circuit.

FIG. 2 shows in greater detail the circuitry of the integrated circuit 12 of FIG. 1. It will be noted that the PLL 31, serializer circuit 32, and self-test circuit 33 each appear in FIG. 2.

The PLL 31 includes a phase detect circuit 56 of known configuration, a charge pump circuit 57 of known configuration, and a voltage controlled oscillator (VCO) 58. The VCO 58 includes seven inverting delay circuits 61–67, which are coupled in series in an endless loop. The delay circuits 61–67 each have a delay which is approximately one-fourteenth of the period of the reference clock 36. Thus, the delay through all seven delay circuits 61–67 is approximately one-half of the period of the reference clock 36. The precise delay through each of the delay circuits 61–67 is adjusted by varying a voltage produced on a line 69 by the charge pump 57, the line 69 being coupled to each of the delay circuit 61–67. The reference clock 36 is coupled to one input of the phase detect circuit 56, and the output 72 of the delay circuit 67 is also coupled to a different input of the phase detect circuit 56, and also to the input of the delay circuit 61.

Assume that there is a leading edge on line 72 at the same time that the reference clock on line 36 has a leading edge. The leading edge on line 72 will propagate through the inverting delay circuits 61-67, and then produce a falling edge on line 72 approximately halfway through the period of the clock 36. The falling edge will then propagate through the delay circuits 61–67, and produce a leading edge on line 72 at substantially the same point in time that the reference clock 36 has its next leading edge. The phase detect circuit 56 detects any variation of the leading edge on line 72 relative to a corresponding leading edge of the reference clock 36, and uses UP and DOWN control lines 73 and 74 in a known manner to control the charge pump circuit 57. This causes the charge pump circuit 57 to vary the control voltage on line 69 in a manner which adjusts the delays through delay circuits 61–67, so as to compensate for and eliminate the phase difference, thereby keeping the VCO 58 operating in close synchronism with the reference clock 36. The seven outputs of the respective delay circuits 61-67 represent seven clock signals which are equivalent to and synchronized with reference clock 36, but which have uniform phase offsets with respect to each other. These seven clock signals are collectively the clock signals 41 discussed above in association with FIG. 1.

The serializer circuit 32 in FIG. 2 includes a clock serializer 81 and a data serializer 82 of known configuration, which each receive the seven clock signals 41 produced by the PLL 31. The clock serializer 81 has a serial output which is coupled to the input of a differential driver 83, the differential outputs of which drive the twisted pair 17. The data serializer 82 has a serial output which is coupled to the input of a further differential driver 84, the differential outputs of which drive the twisted pair 18.

The self-test circuit 33 includes a pattern generator 101, to which is applied the reference clock 36, and the BISTEN self test enable signal 38. The pattern generator 101 has a data output 102, on which it produces a serial bit stream that represents a predetermined test pattern. The pattern generator 101 repeats the generation of this serial test pattern seven successive times. Each time the pattern is completed, the pattern generator 101 generates a strobe pulse on a line 103. The pattern generator 101 may be implemented as a finite state machine. Alternatively, the pattern generator 101 may be implemented with a counter which is reset by the BISTEN signal 38 and clocked by the reference clock 36, and a read-only memory (ROM) which has address inputs coupled to the outputs of the counter, and which has two outputs respectively serving as the data output 102 and strobe output 103.

The strobe output line 103 of the pattern generator 101 is coupled to the count input of an up counter 104, and a reset input of the counter 104 is controlled by the BISTEN signal 38. The counter 104 is a 3-bit counter, which contains a different binary number during each generation of the test pattern. In particular, the counter 104 will contain "001" the first time that the test pattern is generated, "001"1 the second time that the test pattern is generated, "010" the third time that the test pattern is generated, and so forth.

The output of the counter 104 is supplied to a clock decode circuit 106, which outputs a different 7-bit binary word for each state of the counter 104. TABLE 1 shows the respective 7-bit word which is continuously output during each state of the counter 104. It will be noted that each 7-bit word output by the clock decode circuit 106 corresponds to a closed right shift of the immediately proceeding 7-bit word in the table. The clock decode circuit 106 may be implemented using a ROM, where the 3-bit output of the counter 104 is supplied to address inputs of the ROM, and each of the 7-bit words shown in TABLE 1 is stored in a respective memory location in the ROM.

TABLE 1

| Counter Output | Clock Decode Output |
|---|---|
| 000 | 1111000 |
| 001 | 0111100 |
| 010 | 0011110 |
| 011 | 0001111 |
| 100 | 1000111 |
| 101 | 1100011 |
| 110 | 1110001 |

The data output 102 of the pattern generator circuit 101 is supplied to an input of a data decode circuit 107, which also receives the 3-bit output of the counter 104. The data decode circuit 107 has a 7-bit output. The data decode circuit 107 supplies the serial bit stream received on line 102 to a selected one of the lines of its 7-bit output, namely a line selected on the basis of the current state of the counter 104. The data decode circuit 107 supplies to each of the six remaining lines of its 7-bit output the logical inverse of the bit from 102 that it is currently supplying to the selected line. In other words, the first time the pattern generator 101 outputs the serial test pattern on line 102, the data decode circuit 107 will route that serial test pattern to a selected one of its seven output lines. The second time the pattern generator 101 outputs the serial test pattern, the data decode circuit 107 will route that serial test pattern to a different selected one of its seven output lines. Each time the pattern generator 101 generates the serial test pattern, the data code circuit 107 routes the serial test pattern to a respective different one of its seven output lines.

Assuming that the letter "D1" represents the bit on the selected line, and that "d" represents the logical inverse of the state of "D", the 7-bit words generated during self test by the clock decode circuit 106 and the data decode circuit 107 when the counter has the state "000" will be as follows.

Clock decode circuit 106: 1111000

Data decode circuit 107: Ddddddd

In each successive word from the circuit 107, "D" is changed to be a respective successive bit from the serial bit stream at 102. Thereafter, as the pattern generator 101 generates the serial test pattern for the second time during the self test, namely when the counter has the state "001", the 7-bit words generated by the clock decode circuit 106 and the data decode circuit 107 will be as follows.

Clock decode circuit 106: 0111100

Data decode circuit 107: dDddddd

The third time the pattern generator 101 generates the serial test pattern, when the counter has the state "010", the 7-bit words generated by the clock decode circuit 106 and the data decode circuit 107 will be as follows.

Clock decode circuit 106: 0011110

Data decode circuit 107: ddDdddd

It will be noted that the selected bit "D" is always aligned with the "0" to "1" transition in the clock signal.

The self-test circuit 33 includes a pair of two-to-one multiplexers 111 and 112, which are each controlled by the BISTEN signal 38. The multiplexers 111 and 112 each have two 7-bit inputs, and a 7-bit output. The 7-bit inputs of the multiplexer 111 are respectively coupled to the 7-bit output of the clock decode circuit 106, and the 7-bit static clock pattern 46. As mentioned above, the static clock pattern 46 is "1111000" in the disclosed embodiment. The 7-bit output of the multiplexer 111 is coupled at 42 to the clock serializer 81. The other multiplexer 112 has its two inputs respectively coupled to the 7-bit output of the data decode circuit 107, and the 7-bit external data input 37. The 7-bit output of multiplexer 112 is coupled at 43 to the data serializer 82.

When the BISTEN signal 38 is disabling the self test circuit 33, the multiplexer 111 supplies to the clock serializer 81 the static clock pattern 46, and the multiplexer 112 supplies to the data serializer 82 the external data inputs 37. In contrast, when the BISTEN signal 38 is enabling the self-test circuit 33, the multiplexer 111 supplies to the clock serializer 81 the output of the clock decode circuit 106, and the multiplexer 112 supplies to the data serializer 82 the output of the data decode circuit 107.

The clock serializer 81 inputs successive 7-bit words in parallel from lines 42, and then serially outputs the bits of those words to the driver 83. As mentioned above, if the static clock pattern 46 is repeatedly transmitted end-to-end in serial form, the result will be a square wave serial clock. Similarly, if any one of the 7-bit words shown in TABLE 1 is repeatedly transmitted end-to-end in serial form, the result will be a square wave serial clock.

The data serializer 82 accepts 7-bit words in parallel at 43, and it serially outputs those successive words in an end-to-end manner. With respect to the serial test pattern produced at 102 by the pattern generator 101, each bit in the serial bit stream will appear in a respective different 7-bit word at 43. Thus, during self test, only every seventh bit out of the data serializer 82 will be a bit of interest, namely a bit obtained directly from the bit stream at 102. The square wave clock effectively produced by the clock serializer 81 will have its leading edge synchronized to the particular bit of interest, due to the fact that the clock decode circuit 106 and data decode circuit 107 are each responsive to the counter 104. That is, as discussed above, the data decode circuit 107 uses the output of counter 104 to determine which bit position the bits from the serial test pattern at 102 will hold in the words supplied to data serializer 82, which in turn determines the relative position of these bits in the serial bit stream output by the data serializer 82. Similarly, the clock decode circuit 106 uses the output of counter 104 to determine which bit pattern from TABLE 1 to supply to the clock serializer 81, which in turn determines the effective phase of the clock produced by the clock serializer 81, in particular so that the leading edges of the clock are aligned with the leading edges of the bits of interest in the output of data serializer 82.

The self-test circuit 33 includes a differential receiver 121, which receives the differential clock output supplied by the driver 83 to twisted pair 17. In addition, the self-test circuit 33 includes a further differential receiver 122, which receives the differential data output supplied by the driver 84 to twisted pair 18. The serial data output from receiver 122 is coupled to the data input of a D-type flip-flop 126. The clock from the receiver 121 is routed through two inverting delay circuits 127 and 128. The delay circuits 127-128 are the same as the delay circuits 61-67, and the delay through them is controlled by the same control voltage 69. The delay circuits 127-128 thus each have a delay which is approximately one-half the duration of each data bit transmitted serially by the driver 84. Consequently, since the clock transmitted by driver 83 effectively has its active edges aligned with the start of respective data bits of interest, the delay circuit 127 delays the active edges of the clock so that they are each aligned with the center of a respective data bit of interest.

The output of the delay circuit 127 is coupled to the clock input of the flip-flop 126, so that the active edges successively clock the data bits of interest into the flip-flop 126, in a manner so that each bit of interest in the serial stream is sampled at its center. The output of delay circuit 128 is supplied as a clock to a pattern generator 131, which is equivalent to pattern generator 101, and which thus outputs at 132 the same pattern that is generated at 102 by the pattern generator 101.

A comparator 136 compares the output of the pattern generator 132 to the output of flip-flop 126. If there are no failures during self test operation, the bits successively loaded into flip-flop 126 will be identical to the bits serially output at 132 by the pattern generator 131. Consequently, the output of the comparator 136 should be a logic low each time it compares two bits, unless there is an error. The output of the comparator 136 is connected to the J data input of a J-K type flip-flop 137, which is clocked by the same clock as flip-flop 126. So long as no errors are detected by comparator 136, the output of comparator 136 will always be a logic low when the flip-flop 137 is clocked, and the flip-flop 137 will thus never be set unless there is an error. If the flip-flop 137 is set due to an error, it will stay set throughout the remainder of the self-test. The output of the flip-flop 137 is coupled to one input of a two-input NOR gate 141, the output of which serves as the PASS signal 48. If the comparator 136 detects an error and sets the flip-flop 137, the output of flip-flop 137 will transition to a logic high, forcing the PASS signal at 48 to a logic low in order to indicate that a failure has occurred.

It will be recognized that the portion of self-test circuit 33 which includes the comparator 136 and flip-flop 137 will not be capable of detecting faults under certain circumstances, for example if no reference clock is being supplied at 36 to the integrated circuit 12. Accordingly, the self-test circuit 33 also includes a counter 142, which has its reset input controlled by the BISTEN signal 38, and which has its count input coupled directly to the reference clock 36. A carry output of the counter 142 is coupled to the other input of the NOR gate 141. When the counter 142 is reset, its output is a logic high, causing the gate 141 to force the PASS signal 48 to a logic low. When the counter 142 has received a sufficient number of pulses of the reference clock 36 to count to its maximum count state, the counter 142 stop counting and changes its carry output from a logic high to a logic low, thereby permitting the PASS signal 48 to transition from a logic low to a logic high, unless the flip-flop 137 has been set in response to detection of an error. On the other hand, if the reference clock is not present at 36, then the counter 142 will not change its carry output, and the PASS signal 48 will be maintained at a logic low in order to prevent the integrated circuit 12 from being approved without actually being subjected to any test at all.

Figure 3:
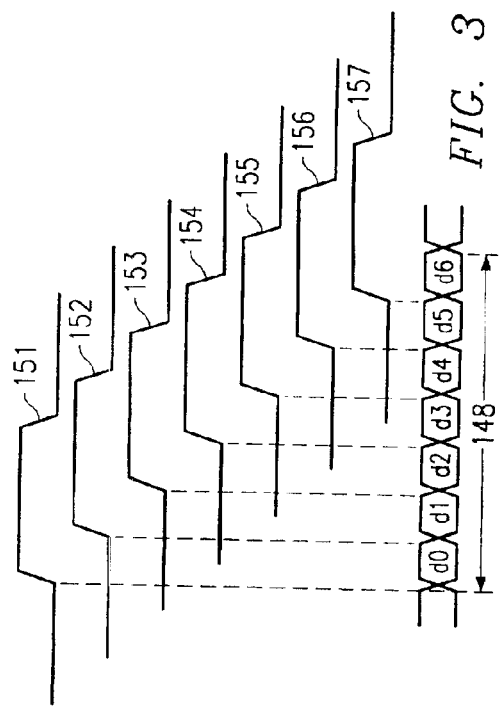
FIG. 3 is a timing diagram which shows the interrelationship of certain signals that are generated by the circuitry of FIG. 2.

FIG. 3 is a timing diagram which shows the various different phases of the clock signal produced during self test by the clock serializer 81, in relation to the serial data stream produced by the data serializer 82. More specifically, FIG. 3 shows a portion of the serial data stream from serializer 82, including a 7-bit word 148 that was received in parallel at 43 by the data serializer 82, and then transmitted serially through the driver 84. The seven bits of the data word 148 are respectively labeled d0 through d6 in FIG. 3. The seven waveforms shown at 151–157 are not seven separate signals, but instead are the seven different phases which the clock decoder circuit 106 can cause the clock serializer 81 to impart to the clock transmitted through driver 83. In particular, and as shown by broken lines, the clock on twisted pair 17 has the phase shown at 151 when the first bit d0 of each word 148 contains a respective bit from the serial bit stream provided at 102, the clock has the phase shown at 152 when the respective bit from the serial bit stream at 102 is in bit d1, and so forth.

The transmitter circuit shown in FIG. 2 operates as follows. During manufacturing testing, the BISTEN self-test enable signal 38 is initially maintained at a logic low, in order to reset the pattern generator 101, counter 104, flip-flop 126, pattern generator 132, flip-flop 137 and counter 142. The BISTEN signal 38 is then changed to a logic high in order to commence the self-test operation. The pattern generator 101 begins generating the serial test pattern on line 102, and the data decode circuit 107 takes each serial bit from line 102 and puts it in a selected bit position of a 7-bit word, while setting all the other bit positions of that word to the inverse of the selected bit. The selected bit position is determined by the current state of counter 104. Each such 7-bit word is applied to the data serializer 82, which successively outputs these words in end-to-end serial form onto the twisted pair 18 through the differential driver 84. While this is occurring, the clock decode circuit 106 continuously supplies through multiplexer 111 to the clock serializer 81 the 7-bit word "1111000", which is shown in the first line of TABLE 1. The clock serializer 81 repeatedly outputs this same 7-bit word in serial form to the twisted pair 17 through the differential driver 83.

Meanwhile, the data bits transmitted serially on twisted pair 18 are successively applied to the input of flip-flop 126, and the clock from twisted pair 17 is delayed by one-half bit time in delay circuit 127, and then used to clock flip-flop 126 at a rate which is one-seventh the serial bit rate on twisted pair 18. Thus, every seventh bit from twisted pair 18 is clocked into flip-flop 126. The pattern generator 131 is generating the same pattern as pattern generator 101, and the comparator 136 compares the bits sampled by flip-flop 126 to the bits produced by pattern generator 131, because they should be the same. If the comparator 136 detects an error, it causes the flip-flop 137 to be set, and through gate 141 this causes an indication on the PASS line 48 that an error has been detected.

When the pattern generator 101 finishes generation of the test pattern at 102 for the first time, it produces a pulse at 103 which causes the counter 104 to increment from "000" to "001", and then starts outputting the test pattern again at 102 from the very beginning. Due to the change in state of the counter 104, the data decode circuit 107 will place the data bits received serially at 102 into a different selected bit position within the 7-bit words that it generates, which will effectively shift the phase of these test bits in the on-going serial data stream output by data serializer 82 through driver 84. Similarly, the change in state of the counter 104 will cause the clock decode circuit 106 to change the 7-bit data pattern supplied through multiplexer to the clock serializer 81, in particular to that shown in the second line of TABLE 1. This effectively shifts the phase of the clock transmitted through driver 83 by an amount corresponding to one bit position in the data stream from driver 84, as shown in FIG. 3. In this manner, the pattern generator 101 will generate the test pattern seven times in succession, while incrementing the counter 104 at the end of each generation of the test pattern. As the counter 104 is incremented, the decode circuits 106 and 107 each change their outputs in a manner so that every bit position within each of the serializers 81 and 82 is tested.

In the meantime, when the BISTEN signal is first enabled, it will stop resetting the counter 142. The counter 142 will thus begin incrementing in response to the reference clock 36, until it reaches its maximum value and changes its carry output from a logic high to a logic low. At the end of the self-test operation, if no error has been detected by comparator 136, the outputs of flip-flop 137 and counter 142 will each be a logic low, such that the PASS signal 48 at the output of the gate 141 will be a logic high, in order to indicate that the integrated circuit 12 has passed the test, or in other words that no errors have been detected.

The self-test mode just described is carried out only during manufacturing testing. When the integrated circuit 12 is thereafter supplied to a customer, the self-test circuit 33 is not used, and in fact the customer will not be aware that it is present. BISTEN input 38 and PASS output 48 are not intended to be coupled to pins of the package within which the integrated circuit 12 is eventually mounted, and the end customer thus does not have access to them.

The present invention provides a number of technical advantages. One such technical advantage is the ability to accurately test a high-performance serial data transmitter while it is operating at the high data rates typical of normal operation, so that critical high-speed signal paths within the transmitter circuit are properly tested. Although only every seventh bit in the serial bit stream is being tested at any given point in time, the transmitter is operating at full high-speed data rates typical of the real world, such that internal propagation delays, critical high-speed data paths and the like are tested at realistic data rates. The phase of the output clock is shifted in order to test each of the bit positions in the serial data stream. A related advantage is that the test is carried out by a built-in test circuit with only a single output, with minimal external interaction. The serializing transmitter can thus be tested at normal operational speeds without requiring external test equipment that can provide or measure signals at such speeds. This avoids the cost and other disadvantages of providing a full deserializing receiver on each integrated circuit chip, solely for purposes of self-test, while also avoiding the expense and inconvenience of using a high-speed test platform.

A further advantage is that the self-test circuit is relatively simple in comparison to a full deserializing receiver, so that the resulting integrated circuit is significantly less complex and significantly more compact than would be the case if it included a full deserializing receiver solely to facilitate testing. Because of the reduced complexity and size, the circuit is less prone to defects and mismatches that could reduce the effective yield of the product. A further advantage is that the test circuit is primarily digital, and thus requires a minimum amount of sensitive analog circuitry.

Although one embodiment has been illustrated and described in detail, it should be understood that various substitutions and alterations can be made therein without departing from the scope of the present invention. For example, the disclosed embodiment uses 7-bit words and seven different phases of a clock signal, but it will be recognized that the number of bits and clocks could be more or less than 7. A further example is that the pattern generators in the disclosed embodiment each generate a predetermined pattern, but it would also be possible to use test patterns which are generated partly or wholly on a dynamic basis. Still another example is that one specific built-in test circuit is illustrated and described in association with the disclosed embodiment, but it will be recognized that there are other configurations of a built-in test circuit which are also encompassed by the present invention. In addition, direct connections disclosed herein could be altered, such that two disclosed components or elements would be coupled to one another through an intermediate device or devices without being directly connected, while still realizing the present invention. Other substitutions and alterations are also possible without departing from the spirit and scope of the present invention, as defined by the following claims.

What is claimed is:

1. A method of testing a circuit which outputs serial information, comprising the steps of:
    instructing the circuit to output a serial bitstream that conforms to a defined bit sequence;
    sampling a plurality of selected bits in said bitstream to determine a state of each of said selected bits, each of said selected bits being separated from other selected bits in said bitstream by at least one nonselected bit; and
    determining whether said state obtained by said sampling for each said selected bit conforms to an expected state therefor according to said defined bit sequence; wherein said defined bit sequence includes N successive subsequences, and including the step of shifting sampling times relative to said bitstream by one bit width at the end of each said subsequence.

2. A method according to claim 1, wherein said sampling step includes the step of sampling every Nth bit of said bitstream.

3. A method according to claim 2, wherein said defined bit sequence includes a plurality of successive groups of N bits, each said group having one bit which corresponds to a respective one of said selected bits in said serial bitstream, and having N-1 further bits which each have a logical state that is the inverse of the logical state of said one bit.

4. A method according to claim 1, wherein said circuit also outputs a serial bit sequence representing a clock synchronized to said serial bitstream, said serial bitstream having a number of bits per second which is N times a frequency of said clock, said sampling being carried out in a manner synchronized to said clock, and said step of shifting sampling times being carried out by changing said serial bit sequence in a manner which effectively shifts the phase of said clock relative to said serial bitstream.

5. An apparatus, comprising:
    a circuit operable to output serial information;
    a control section operable to instruct said circuit to output a serial bitstream that conforms to a defined bit sequence;
    a sampling section operable to sample a plurality of selected bits in said bitstream to determine a state of each of said selected bits, each of said selected bits being separated from other selected bits in said bitstream by at least one nonselected bit; and
    an error detecting section operable to determine whether said state obtained by said sampling section for each said selected bit conforms to an expected state therefor according to said defined bit sequence,
    wherein said control section is operable to cause said defined bit sequence to include N successive subsequences, and wherein said sampling section is operable to shift sampling times relative to said bitstream by one bit width at the end of each said subsequence.

6. An apparatus according to claim 5, wherein said sampling section is operable to sample every Nth bit in said serial bitstream.

7. An apparatus according to claim 6, wherein said control section is operable to use as said defined bit sequence a plurality of successive groups of N bits, each said group including one bit that corresponds to a respective one of said selected bits in said serial bitstream, and including N-1 further bits that each have a logical state which is the inverse of the logical state of said one bit.

8. An apparatus according to claim 5, wherein said circuit includes a data serializer which has an N-bit parallel input and which generates said serial bitstream by serially outputting the bits of successive N-bit words supplied to said parallel input thereof; and wherein said control section is operable to supply a sequence of N-bit words to said parallel input of said serializer during each said subsequence.

9. An apparatus according to claim 8, wherein said control section includes a portion which is operable to generate a predetermined sequence of N-bit words N successive times which each correspond to a respective said subsequence, and includes a decoder which is operable to effect a closed rotate of said bits of each said N-bit word by a number of bits which is different during each said subsequence, the rotated N-bit words from said decoder being supplied to said parallel input of said serializer.

10. An apparatus according to claim 9, wherein said control section includes a multiplexer having an N-bit first input to which is applied a predetermined N-bit word, having an N-bit second input to which is applied the rotated N-bit words from said decoder, and having an N-bit output which is coupled to said parallel input of said serializer; and wherein said control section is operable to cause said multiplexer to select said first input during a normal operational mode and to select said second input during a test operational mode.

11. An apparatus according to claim 5, wherein said circuit also outputs a serial bit sequence representing a clock synchronized to said serial bitstream, the number of bits per second in said serial bitstream being N times the frequency of said clock, said sampling section being operable to carry out said sampling in a manner synchronized to said clock, and said control section being operable to effect said shifting of said sampling times by changing said serial bit sequence in a manner corresponding to a change in the phase of said clock relative to said serial bitstream.

12. An apparatus according to claim 11, wherein said circuit includes a clock serializer which has an N-bit parallel input, and which generates said serial bit sequence by serially outputting the bits of successive N-bit words supplied to said parallel input thereof; and wherein said control section includes a portion operable to continuously supply a selected N-bit word to said parallel input of said serializer throughout each said subsequence, and to effect said change in the phase of said clock by changing the selected N-bit word at the end of each said subsequence.

13. An apparatus according to claim 12, wherein said control section includes a multiplexer having an N-bit first input to which is applied a predetermined N-bit word, having an N-bit second input to which is applied the selected N-bit words from said portion of said control section, and having an N-bit output which is coupled to said parallel input of said serializer; and wherein said control section is operable to cause said multiplexer to select said first input during a normal operational mode and to select said second input during a test operational mode.

14. An apparatus according to claim 5, wherein said error detecting section includes a pattern generator operable to produce a serial bit sequence which represents successive said expected states of said selected bits in said bitstream, and includes a comparator operable to successively compare said states obtained by said sampling section for said selected bits to said expected states in said bit sequence from said pattern generator, said comparator having an output which is coupled to an output port of said apparatus.

15. An apparatus according to claim 5, wherein said control circuit operates in response to an input clock from an input port; and
    wherein said error detecting section includes a counter operable to count pulses of said input clock, said counter having an output which is coupled to an output port of said apparatus.

16. An integrated transmitter circuit, comprising:

a circuit operable to output serial information corresponding to parallel data provided thereto;

a control section operable to instruct said circuit to output a serial bitstream that conforms to a defined bit sequence;

a sampling section operable to sample a plurality of selected bits in said bitstream to determine a state of each of said selected bits, each of said selected bits being separated from other selected bits in said bitstream by at least one nonselected bit; and an error detecting section operable to determine whether said state obtained by said sampling section for each said selected bit conforms to an expected state therefor according to said defined bit sequence;

wherein said sampling section is operable to sample every Nth bit in said serial bitstream, and wherein said control section is operable to use as said defined bit sequence a plurality of successive groups of N bits, each said group including one bit that corresponds to a respective one of said selected bits in said serial bitstream, and including N-1 further bits that each have a logical state which is the inverse of the logical state of said one bit.

17. An transmitter circuit according to claim 16 further comprising:

an output circuit operable to output said serial information, wherein said output circuit includes a data serializer which has an N-bit parallel input and which generates said serial information by serially outputting the bits of successive N-bit words supplied to said parallel input thereof; and wherein said control section includes a portion which is operable to generate a predetermined sequence of N-bit words N successive times which each correspond to a respective said subsequence, and includes a decoder which is operable to effect a closed rotate of said bits of each said N-bit word by a number of bits which is different during each said subsequence, the rotated N-bit words from said decoder being supplied to said parallel input of said serializer.

18. A transmitter circuit according to claim 17, wherein said control section includes a multiplexer having an N-bit first input to which is applied a predetermined N-bit word, having an N-bit second input to which is applied the rotated N-bit words from said decoder, and having an N-bit output which is coupled to said parallel input of said serializer; and wherein said control section is operable to cause said multiplexer to select said first input during a normal operational mode and to select said second input during a test operational mode.

19. A transmitter according to claim 16, wherein said error detecting section includes a pattern generator operable to produce a serial bit sequence which represents successive said expected states of said selected bits in said bitstream, and includes a comparator operable to successively compare said states obtained by said sampling section for said selected bits to said expected states in said bit sequence from said pattern generator, said comparator having an output which is coupled to an output port of said apparatus.

* * * * *